(12) United States Patent
Lauder et al.

(10) Patent No.: US 9,828,089 B2
(45) Date of Patent: Nov. 28, 2017

(54) ROTOR DRIVE SYSTEMS FOR ROTORCRAFT

(71) Applicant: Sikorsky Aircraft Corporation, Stratford, CT (US)

(72) Inventors: Timothy F. Lauder, Oxford, CT (US); Jonathan Hartman, Lorton, VA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 201 days.

(21) Appl. No.: 15/010,970

(22) Filed: Jan. 29, 2016

(65) Prior Publication Data

US 2017/0217576 A1    Aug. 3, 2017

(51) Int. Cl.
*B64C 27/00*      (2006.01)
*B64C 27/14*      (2006.01)

(52) U.S. Cl.
CPC .................................. *B64C 27/14* (2013.01)

(58) Field of Classification Search
CPC .......... B64C 27/14; B64C 27/04; B64D 35/02
See application file for complete search history.

(56) References Cited

U.S. PATENT DOCUMENTS

| | | | | |
|---|---|---|---|---|
| 1,936,542 A | * | 11/1933 | Nardone | F16D 41/00 192/48.6 |
| 3,362,255 A | * | 1/1968 | De Rocca | B64C 27/12 192/47 |
| 4,558,770 A | * | 12/1985 | Woodruff | F16D 41/00 192/48.6 |
| 4,899,957 A | * | 2/1990 | Eickmann | B64C 11/28 244/17.11 |
| 5,271,295 A | * | 12/1993 | Marnot | B64C 27/14 244/58 |
| 6,484,967 B2 | | 11/2002 | Protte | |
| 2013/0126669 A1 | * | 5/2013 | Hamann | B64C 27/12 244/60 |
| 2015/0093272 A1 | * | 4/2015 | Komer | B64C 11/38 417/423.1 |
| 2017/0040870 A1 | * | 2/2017 | Ballauf | H02K 1/30 |
| 2017/0167317 A1 | * | 6/2017 | Lee | F01L 9/04 |

FOREIGN PATENT DOCUMENTS

JP      2014149075 A      8/2014

* cited by examiner

*Primary Examiner* — Philip J Bonzell
(74) *Attorney, Agent, or Firm* — Locke Lord LLP; Scott D. Wofsy; Christopher J. Cillié

(57) ABSTRACT

A rotor drive system includes a mast defining a rotation axis, an electric motor with a stator portion fixed to the stationary mast, a rotor portion rotatably relative to the stator portion, and a clutch disposed along the rotation axis and connected to the rotor portion of the electric motor. A rotor assembly is rotatable about the rotation axis and operably connected to clutch such that, when rotational speed of the rotor assembly exceeds rotational speed of the rotor portion of the electric motor, the clutch disengages the rotor assembly from the electric motor rotor portion.

20 Claims, 6 Drawing Sheets

ROTOR DRIVE SYSTEMS FOR ROTORCRAFT

BACKGROUND OF THE INVENTION

1. Field of the Invention

The present disclosure relates to rotor drive systems, and more particularly to clutches for rotor drive systems in rotorcraft.

2. Description of Related Art

Rotorcraft like helicopters commonly employ rotor systems to provide lift. The rotor system generally receives rotational power from source of rotation, such as from a piston or turbine engine coupled to the rotor system through a transmission. Since the rotor system typically rotates at a slower speed than the engine, rotorcraft drive systems commonly include gearboxes for reducing the speed of mechanical rotation provided by the engine and transferred to the rotor system through the drive system. Under some conditions, such as during autorotation, it can be necessary to disconnect the rotor system from the drive system and gearbox using a clutch mechanism arranged in the force flow between the gearbox and the engine. The clutch mechanism is typically arranged at the gearbox input stage, where rotational speed is relatively high and torque is low, which allows for the clutch to incorporate a relative compact and lightweight arrangement like that of a sprag clutch. Such clutch mechanisms allow the rotor system to overrun the drive system rotationally. During overrunning, the clutch input and output members of the clutch mechanism maintain physical contact with one another, typically requiring a lubricant bath that cools and limits wear of the contacting members.

Such conventional methods and systems have generally been considered satisfactory for their intended purpose. However, there is still a need in the art for improved rotorcraft and rotorcraft drive systems. The present disclosure provides a solution for this need.

SUMMARY OF THE INVENTION

A rotor drive system includes a stationary mast defining a rotation axis, an electric motor with a stator portion fixed to the stationary mast, a rotor portion rotatably relative to the stator portion, and a clutch disposed along the rotation axis and connected to the rotor portion of the electric motor. A rotor assembly is rotatable about the rotation axis and operably connected to clutch such that, when rotational speed of the rotor assembly exceeds rotational speed of the rotor portion of the electric motor, the clutch disengages the rotor assembly from the electric motor rotor portion.

In certain embodiments, the clutch can include a roller ramp clutch mechanism. The roller ramp clutch mechanism can include an inner hub, an outer hub, and one or more roller elements. The inner hub can extend circumferentially about the rotation axis defined by the mast. The inner hub can be fixed relative to the rotor portion of the electric motor. The inner hub can define a roller element race. The roller element race can face radially outward relative to the rotation axis defined by the stationary mast. The one or more roller elements can be disposed radially between the inner hub and the outer hub of the roller ramp mechanism.

In accordance with certain embodiments, the outer hub can extend circumferentially about the inner hub. The outer hub can axially overlap the inner hub of the roller ramp clutch mechanism. The outer hub can be fixed relative to the rotor assembly. The outer hub can define a wedge pocket that opposes the inner hub, can face the inner hub across the gap between the inner hub and outer hub, and can be separated therefrom by a radial gap. The wedge pocket can be bounded by a planar segment that is oblique relative to a line tangent to the inner hub. A radially extending first finger can bound the wedge pocket on a leading end of the pocket relative to the direction of rotation of the rotor assembly. A radially extending second finger can bound the wedge pocket. The second finger can be disposed on a trailing end of the pocket relative to the direction of rotation of the rotor assembly. It is contemplated that the wedge pocket can have a radial depth on a trailing end that is greater a radial depth on a leading end relative to the direction of rotation of the rotor assembly about the rotation axis.

It is also contemplated that, in accordance with certain embodiments, the roller element can be captive within the wedge pocket. The roller element can be movable between first and second positions within the wedge pocket, the second position trailing the first position relative to a rotation direction of the rotor assembly about the rotation axis. In the first position the roller element can be in mechanical contact with the inner hub and the outer hub. The roller element can be fixed relative to a roller element axis defined by the roller element in the first position. In the second position the roller element can be rotationally free relative to the roller element axis defined by the roller element. A resilient member can be seated within the wedge pocket between the outer hub and the roller element, the resilient member urging the roller element into contact with the inner hub. It is contemplated that movement of the roller element into the first position can engage the clutch, and movement of the roller element into the second position can disengage the clutch.

A rotorcraft includes an airframe and a drive system as described above. The stationary mast is fixed to the airframe and the clutch is disposed externally of the airframe. The stator portion of the electric motor can be splined to the stationary mast. In embodiments, a clutch lock can be disposed axially between the rotor assembly and the electric motor along the rotation axis. The clutch lock can have a locked position and an unlocked position. In the locked position, the clutch lock can couple the electric motor to the rotor assembly such that the rotor assembly and electric motor are rotationally fixed relative to one another when the clutch is engaged and disengaged. In the unlocked position, the rotor assembly and electric motor can be rotationally fixed relative to one another when the clutch is engaged, and the rotor assembly and electric motor can be rotationally free relative to one another when the clutch is disengaged. In certain embodiments, bearings may be disposed radially between the outer hub of the clutch and the stationary mast. Bearings can be disposed between the inner hub of the clutch and the stationary mast. It is also contemplated that the stator portion of the electric motor can be disposed radially between the stationary mast and the bearings.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
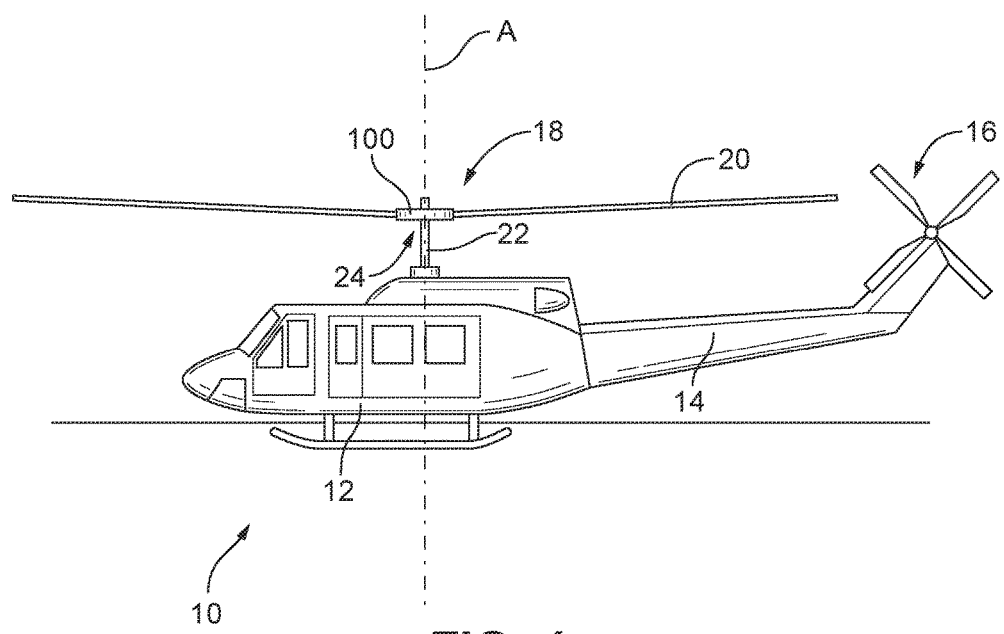
FIG. 1 is a schematic side elevation view of an exemplary embodiment of a rotorcraft constructed in accordance with the present disclosure, showing a rotor drive system for an electric or hybrid-electric rotorcraft.

Reference will now be made to the drawings wherein like reference numerals identify similar structural features or aspects of the subject disclosure. For purposes of explanation and illustration, and not limitation, a partial view of an exemplary embodiment of a rotor drive system in accordance with the disclosure is shown in FIG. 1 and is designated generally by reference character 100. Other embodiments of rotor systems and rotorcraft having such rotor drive systems in accordance with the disclosure, or aspects thereof, are provided in FIGS. 2-6, as will be described. The systems and methods described herein can be used in electric or hybrid-electric rotorcraft, however the invention is not limited to a particular type of aircraft nor to aircraft in general.

Referring to FIG. 1, a rotorcraft 10 is shown. Rotorcraft 10 includes an airframe 12, a longitudinally extending tail 14 with an anti-torque system 16, and a rotor assembly 18. Rotor assembly 18 includes one or more rotor blade 20 supported for rotation about a rotation axis A by a stationary mast 22. Stationary mast 22 extends upwards from airframe 12 and seats rotor drive system 100, which is operably connected to rotor assembly 18. In the illustrated exemplary embodiment, rotorcraft 10 is a vertical takeoff and landing (VTOL) rotorcraft and includes an electric propulsion system which may generally include the integration of a direct drive electric motor, which may be integrated into a distal end portion 24 of stationary mast 22 and spaced above airframe 12.

Figure 2:
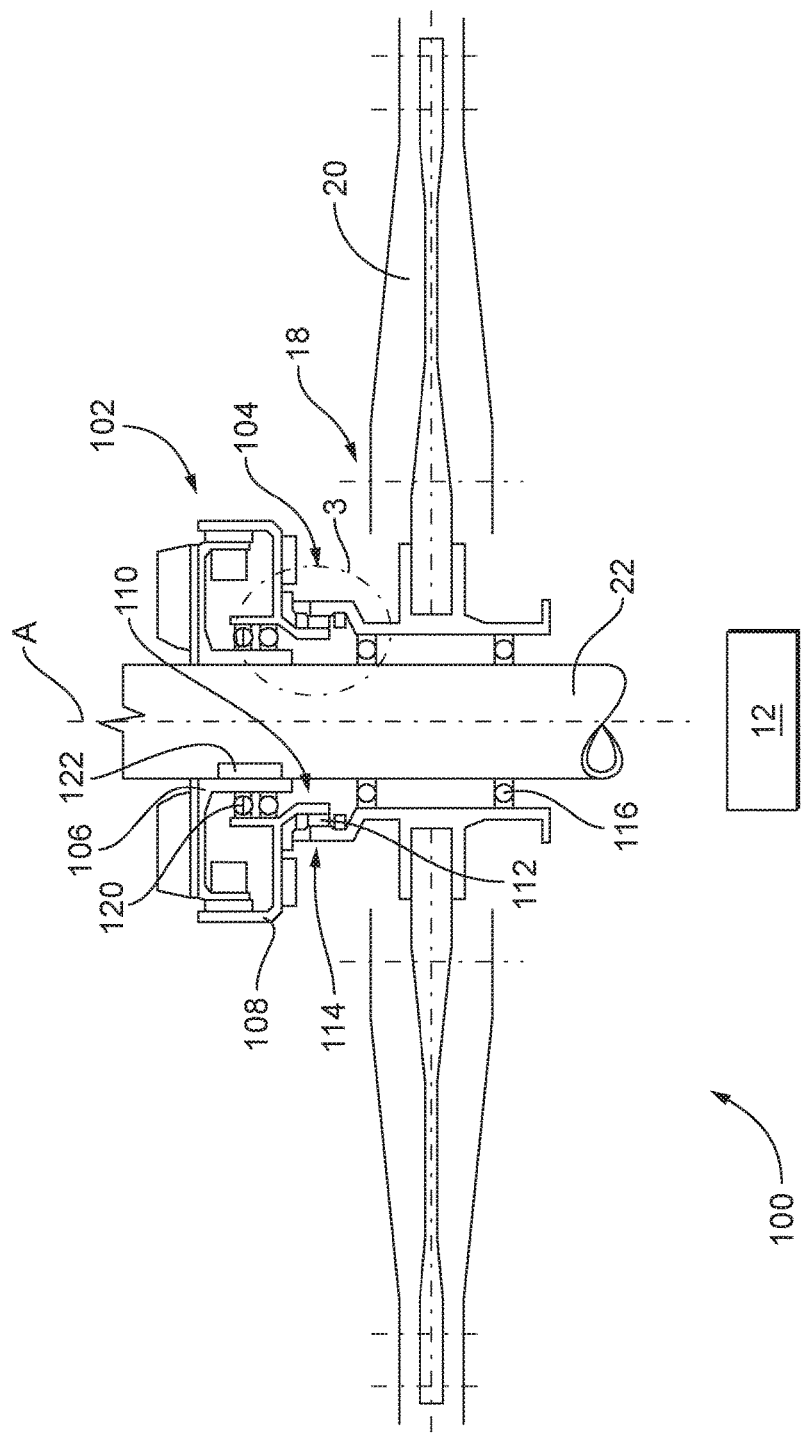
FIG. 2 is a schematic cross-sectional side view of the rotor drive system of the rotorcraft illustrated in FIG. 1, showing a clutch disposed between a rotor assembly and an electric motor of the drive assembly.

With reference to FIG. 2, rotor drive system 100 is shown. Rotor drive system 100 includes stationary mast 22, rotor assembly 18, an electric motor 102, and a clutch 104. Stationary mast 22 defines rotation axis A and supports rotor assembly 18 for rotation about rotation axis A. Electric motor 102 includes a stator portion 106 and a rotor portion 108. Stator portion 106 is fixed relative to stationary mast 22. Rotor portion 108 is rotatable relative to rotor portion 108 about rotation axis A. Clutch 104 is disposed along rotation axis A and is fixed relative to rotor portion 108 of electric motor 102.

Rotor assembly 18 is disposed about rotation axis A. Clutch 104 is coaxially disposed about rotation axis A with rotor assembly 18. Electric motor 102 is also coaxially disposed about rotation axis A with rotor assembly 18 and is axially offset from rotor assembly 18 along rotation axis A. Clutch 104 is axially interposed between rotor assembly 18 and electric motor 102 along rotation axis A. In the illustrated exemplary embodiment clutch 104 and electric motor 102 are disposed externally of airframe 12 and on a side of rotor assembly 18 opposite airframe 12.

Figure 3:
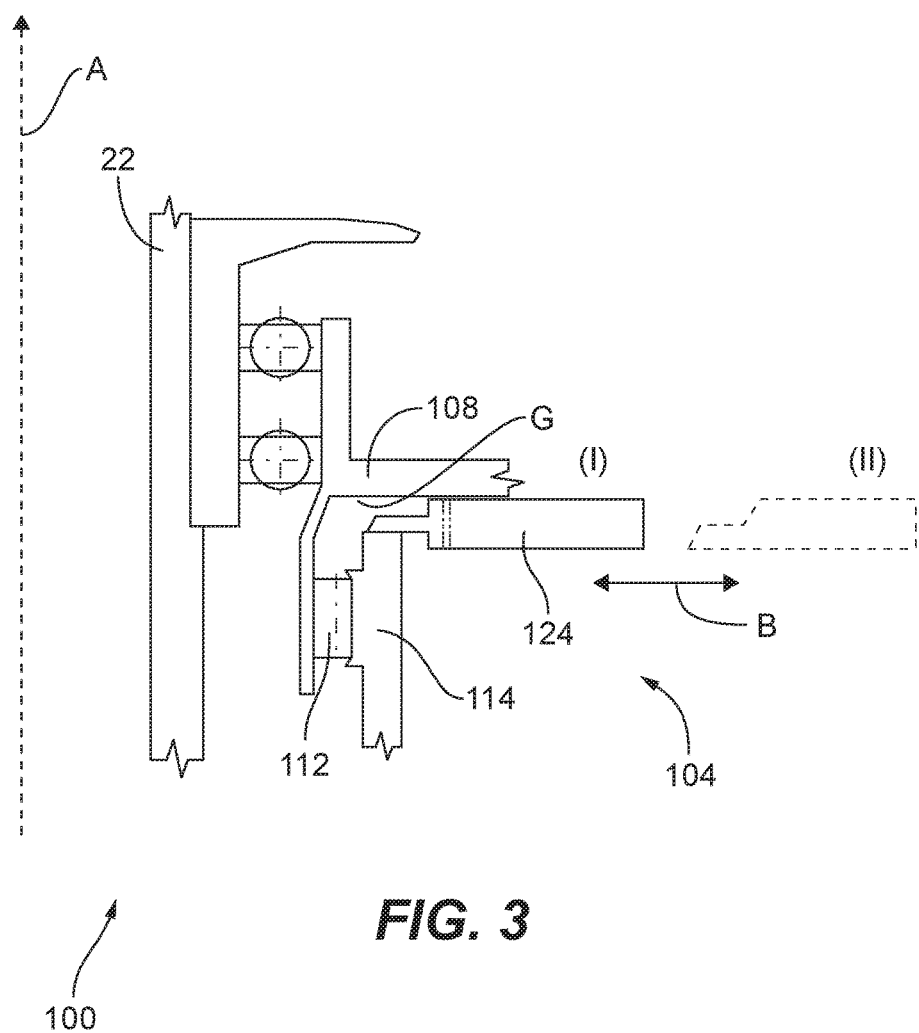
FIG. 3 is a schematic cross-sectional side view of a portion of the rotor drive system of FIG. 2, showing a clutch lock of the rotor drive system in a locked position and an unlocked position.

Clutch 104 includes an inner hub 110, a roller element 112, and an outer hub 114. Inner hub 110 is fixed relative to rotor portion 108 of electric motor 102 and extends circumferentially about rotation axis A. Outer hub 114 is disposed radially outward of inner hub 110, extends circumferentially about inner hub 110, axially overlaps inner hub 110 along rotation axis A, and is fixed to rotor assembly 18. Roller element 112 is disposed radially between inner hub 110 and other hub 114, and as shown in FIG. 3, is circumferentially captive relative to outer hub 114.

With continuing reference to FIG. 2, a first bearing arrangement 116 is disposed radially between inner hub 110 and stationary mast 22, thereby allowing rotor assembly 18 to rotate about rotation axis A relative to stationary mast 22. A second bearing arrangement 120 is disposed radially between inner hub 110 and stationary mast 22, allowing rotor portion 108 of electric motor 102 to rotate about rotation axis A relative to stator portion 106 of electric motor 102. Stator portion 106 of electric motor 102 is fixed relative to stationary mast 22, such as with a spline structure 122.

Clutch 104 is an overrunning clutch with an engaged configuration and a disengaged configuration to selectively transfer torque between electric motor 102 and rotor assembly 18 according to rotational speed of rotor assembly 18 relative to electric motor 102. In the engaged configuration clutch 104 rotationally couples rotor assembly 18 to electric motor 102, matching rotational speed of rotor assembly 18 to electric motor 102 and transferring torque between electric motor 102 and rotor assembly 18. In the disengaged configuration, clutch 104 rotationally decouples rotor assembly 18 from electric motor 102, allowing rotational speed of the rotor assembly 18 to exceed rotational speed of electric motor 102 and ceasing torque transfer between electric motor 102 and rotor assembly 18 through clutch 104. Configuration of clutch 104 changes according to movement of roller element 112 between respective roller first and second positions between inner hub 110 and outer hub 114, as will be described.

Rotor assembly 18 is fixed to clutch 104 such that, when clutch 104 is engaged, rotor portion 108 of electric motor 102 and rotor assembly 18 (shown in FIG. 2) are rotationally fixed relative to one another through outer hub 114 of clutch 104. When clutch 104 is disengaged, rotor portion 108 of electric motor 102 is rotationally free from rotor assembly 18, and rotor assembly 18 may rotate at a rotational speed about rotation axis A that is different a rotational speed of rotor portion 108 of electric motor 102 about rotational axis A. As will be appreciated by those of skill in the art in view of the present disclosure, this allows rotor assembly 18 to autorotate about rotation axis A, such as by overrunning rotor portion 108 of electric motor 102.

Referring now to FIG. 3, a clutch lock 124 of rotor drive system 100 is shown. Clutch lock 124 is disposed axially along rotation axis A between rotor portion 108 of electric motor 102 (shown in FIG. 2) and outer hub 114 of clutch 104. Clutch lock 124 is also disposed radially outward of roller element 112 and stationary mast 22 relative to rotation axis A, and is configured an adapted to seat with in an axial gap G defined between opposed axial faces of outer hub 114 of clutch 104 and rotor portion 108 of electric motor 102.

As indicated with movement arrow B, clutch lock 124 is movable between a locked position I and an unlocked position II. In the locked position I (shown in solid outline), clutch lock 124 rotationally fixes outer hub 114 of clutch 104 to rotor portion 108 of electric motor 102. This allows rotor assembly 18 and rotor portion 108 of electric motor 102 to rotate in concert with one another irrespective of whether clutch 104 is engaged. In the unlocked position II (shown in dashed outline), clutch lock 124 allows the rotational relationship of rotor portion 108 of electric motor 102 outer hub 114 of clutch 104 to be determined by whether clutch 104 is in the engaged configuration or the disengaged configuration. As will be appreciated by those of skill in the art in view of the present disclosure, clutch lock 124 provides an on-ground locking feature which permits rotor assembly 18 to windmill and transfer torque from rotor assembly 18 to electric motor 102, thereby generating electrical power using rotor drive system 100, such as for charging batteries carried by airframe 12 (shown in FIG. 1) by way of non-limiting example. As will also be appreciated by those of skill in the art in view of the present disclosure, clutch lock 124 can be operably associated with weight-on-wheels sensor and configured for a default, normally unlocked, arrangement to prevent engagement during flight.

Figure 4:
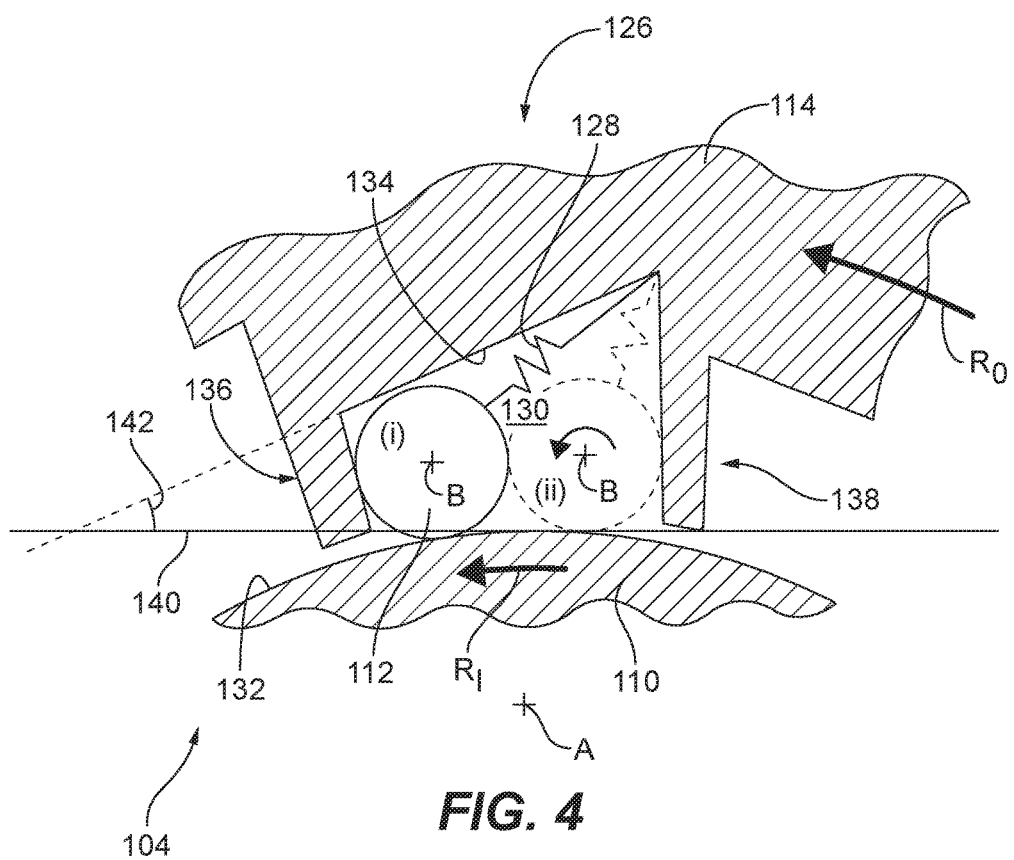
FIG. 4 is schematic cross-sectional plan view of the clutch of the rotor drive system illustrated in FIG. 2, showing a roller element of the clutch radially disposed and circumferentially captive between inner and outer hubs of the clutch.

With reference to FIG. 4, clutch 104 is shown is an axial cross-sectional view. Clutch 104 includes a roller ramp clutch mechanism generally indicated by reference numeral 126. Roller ramp clutch mechanism 126 includes roller element 112, a resilient member 128, a wedge pocket 130, and roller element race 132. Roller element race 132 is defined on a face of inner hub 110 opposing outer hub 114 and wedge pocket 130. Roller element race 132 faces radially outward relative to rotation axis A, and is radially separated from outer hub 114 by a radial gap. The width of the radial gap varies circumferentially according to the geometry of the face of outer hub 114 facing inner hub 110.

Roller element 112 is disposed radially between outer hub 114 and inner hub 110, and is circumferentially captive relative to outer hub 114 within wedge pocket 130. Resilient member 128 is disposed within wedge pocket 130 and between outer hub 114 and roller element 112. In the illustrated exemplary embodiment, resilient member 128 is shown as a spring (schematically) arranged to urge roller element 112 in the direction of rotation of outer hub 114 about rotation axis A.

Wedge pocket 130 opposes inner hub 110 such that roller element 112 is radially adjacent to roller element race 132. Wedge pocket 130 is bounded a planar segment 134 of outer hub 114, a radially extending first finger 136 of outer hub 114, and radially extending second finger 138 of outer hub 114. First finger 136 extends radially inward from outer hub 114 toward roller bearing face 132. Second finger 138 extends from outer hub 114 towards roller bearing face 132 and is circumferentially offset from first finger 136 about rotation axis A. Planar segment 134 extends between first finger 136 and second finger 138, and is angled relative to a line 140 tangent to inner hub 110. Planar segment 134 tangent line 140 intersect one another at wedge angle 142 which, in the illustrated exemplary embodiment, is acute in the direction of rotation of outer hub 114 about rotation axis A. Line 140 is tangent relative to inner hub 110 at location that is, for example, equally spaced circumferentially between first finger 136 and second finger 138.

Because wedge angle 142 is acute, wedge pocket 130 has a depth in a portion on a leading end of wedge pocket 130 that is radially more shallow that that of a trailing portion of wedge pocket, leading and trailing being relative to a direction of rotation of outer hub 114 about rotation axis A. As a consequence, rotation of inner hub 110 tends to advance roller element 112 circumferentially within wedge pocket 130, i.e. towards the shallow end of wedge pocket 130. This causes roller element 112 to lodge between inner hub 110 and outer hub 114 in a first position (i) (shown in solid outline), wherein roller element 112 is fixed rotationally about a roller element axis B defined by roller element 112 and is in intimate mechanical contact with both inner hub 110 and outer hub 114. Lodgment of roller element 112 between inner hub 110 and outer hub 114 fixes inner hub 110 rotationally relative to outer hub 114. Fixation of inner hub 110 to outer hub 114 in turn matches rotational speed $R_O$ of outer hub 114 with rotational speed $R_I$ of inner hub 110, torque thereby transferring electric motor 102 and rotor assembly 108.

In contrast, when rotor assembly 18 (shown in FIG. 2) overruns rotor portion 108 of electric motor 102 (shown in FIG. 2), roller element 112 moves by circumferentially displacing relative to outer hub 114 to a second position (ii) (shown in dashed outline) within wedge pocket 130, disengaging clutch 104. In the second position (ii), roller element 112 is rotatable about roller rotation axis B and is not frictionally fixed between inner hub 110 and outer hub 114. This allows rotational speed $R_O$ of outer hub 114 to exceed that of rotational speed $R_I$ of inner hub 110, rotor assembly 18 thereby being to overrun electric motor 102, such as when rotorcraft 10 (shown in FIG. 1) is in an autorotation state. Notably, resilient member 128 urges roller element 112 against roller element race 132, overcoming centrifugal force exerted on roller element 112, and maintaining frictional contact between roller element 112 and roller element race 132.

Figure 5:
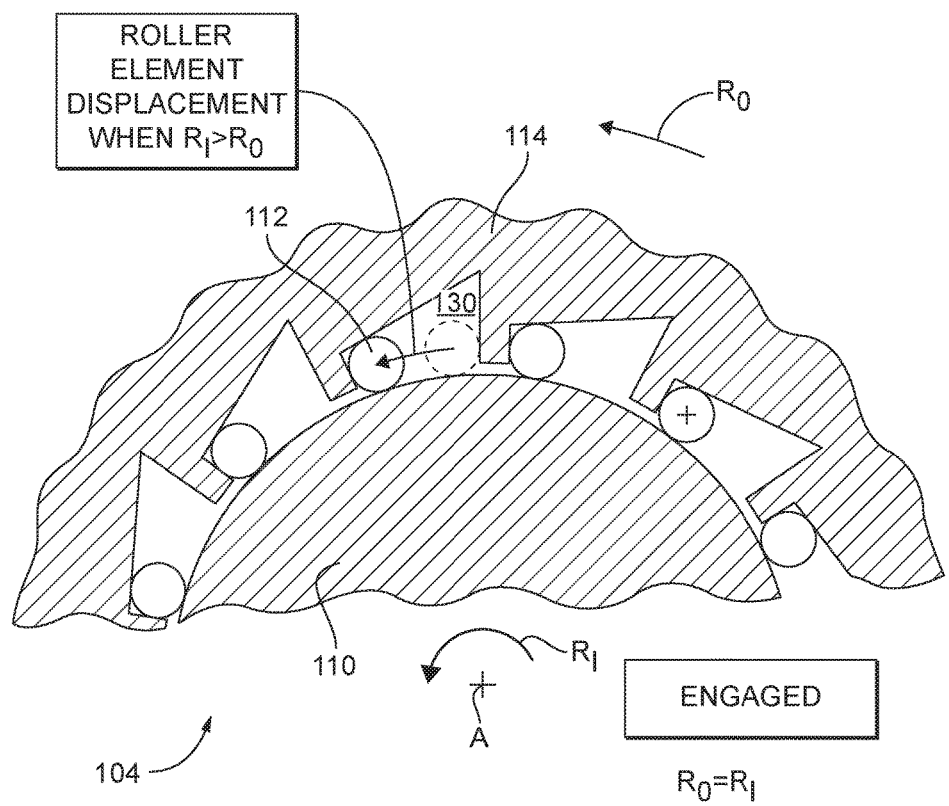
FIG. 5 is schematic cross-sectional plan view of the clutch of the rotor drive system illustrated in FIG. 2, showing roller elements of the clutch disposed in circumferentially leading portions of outer hub wedge pockets when the clutch is engaged.
Figure 6:
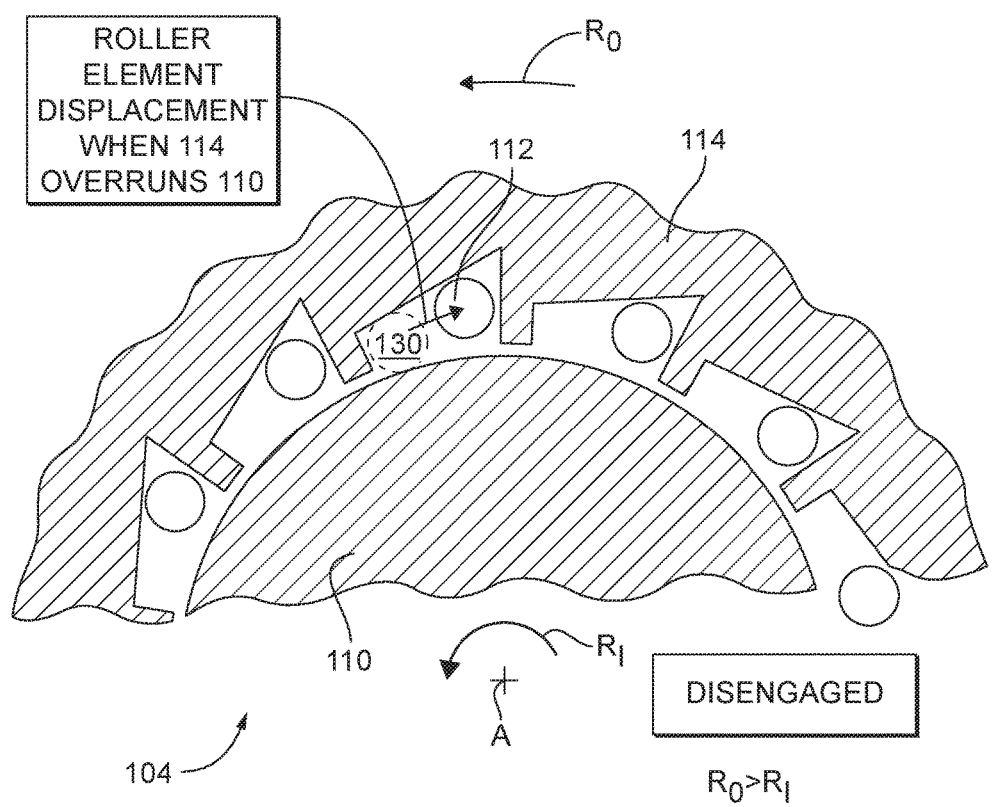
FIG. 6 is schematic cross-sectional plan view of the clutch of the rotor drive system illustrated in FIG. 2, showing roller elements of the clutch disposed in circumferentially trailing portions of outer hub wedge pockets when the clutch is disengaged.

Referring now of FIGS. 5 and 6, clutch 104 is shown in the engaged configuration and in the disengaged configuration. As shown in FIG. 5, when the rotational speed of inner hub 110 exceeds the rotational speed of outer hub 114, i.e. $R_I$ is greater than $R_O$, each roller element 112 of the plurality of roller elements displaces to the leading portion of the wedge pocket 130. Movement into the leading portion of wedge pocket 130 compresses the respective roller element 112 between inner hub 110 and outer hub 114. The compression is such that inner hub 110 locks (i.e. becomes rotationally fixed) to outer hub 114, enabling torque transfer from electric motor 102 (shown in FIG. 2) to rotor assembly 18 (shown in FIG. 2) from inner hub 110 and through outer hub 114, and matching rotational speed $R_I$ of inner hub 110 with rotational speed $R_O$ of outer hub 114.

With reference to FIG. 6, clutch 104 is shown in the disengaged configuration that results from outer hub 114 overrunning inner hub 110. When rotational speed $R_O$ of outer hub 114 exceeds rotational speed $R_I$ of inner hub 110 each roller element 112 displaces from the leading portion wedge pocket 130 to the trailing portion of wedge pocket 130. Displacement from the leading portion of wedge pocket 130 frees outer hub 114 from inner hub 110, allowing outer hub 114 to overrun inner hub 110, and enabling outer hub 114 to remain rotationally free until rotational speed $R_O$ of outer hub 114 matches rotational speed $R_I$ of inner hub 110, at which clutch 104 returns to the engaged configuration (shown in FIG. 5).

In the illustrated exemplary embodiment each roller element 112 is captive within outer hub 114. As outer hub 114 is radially outward of inner hub 110, each roller element 112 is offset from rotation axis A by a relatively large radial offset. The relatively large radial offset enables use of a large number of roller elements (e.g., more than 6) in a circumferential array about rotation axis A. This reduces the load carried by each roller element 112 individually by virtue of the sharing across the roller element set, improving the reliability of clutch 104.

In embodiments described herein, a clutch with a wedge ramp roller includes an inner hub connected to the electric motor rotor portion, an outer hub connected to a rotor assembly, roller elements radially disposed between the inner hub and the outer hub that transfer torque therebetween when compressed, and resilient members that urge the roller elements into contact with the inner hub when experiencing centrifugal forces associated when rotation of the outer hub is insufficient, thereby maintaining contact between the roller elements and the inner hub. The outer hub of the clutch houses the roller elements and the resilient elements, and defines wedge pockets bounded by respective planar segments that 'wedge' the roller elements against the inner hub of the clutch. When the clutch is engaged, the inner hub rotates and torque is transferred from the inner hub to the outer hub through the roller elements such that the inner hub drives the outer hub. In the event that the inner hub begins turning slower than the outer hub, the clutch disengages, and freewheeling (or overrunning) of the outer hub about the inner hub occurs. During freewheeling, e.g., when the main rotor is turning faster than the drive motor, centrifugal force urges the roller elements out of contact with the inner hub outward, off the inner hub, and compressing the resilient members, eliminating contact and reducing friction, thereby reducing wear and heat while allowing the outer hub (rotor) to continue to overrun the inner hub.

The methods and systems of the present disclosure, as described above and shown in the drawings, provide for rotor drive systems and rotorcraft with employing such drive systems with superior properties, including rotor assembly overrunning capability witch clutches deployed at locations having relatively low rotational speed and comparatively high torque, such as in electric or hybrid-electric rotorcraft. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor drive system, comprising:
a stationary mast defining a rotation axis;
an electric motor with a stator portion fixed to the mast and a rotor portion rotatable relative to the stator portion about the rotation axis;
a clutch connected to the rotor portion of the electric motor; and
a rotor assembly rotatable about the rotation axis and operably connected to the clutch, wherein the clutch is coaxially arranged between the electric motor and the rotor assembly about the rotation axis to disengage the electric motor from the rotor assembly when rotational speed of the rotor assembly about the rotation axis exceeds rotational speed of the rotor portion of the electric motor.

2. A rotor drive system as recited in claim 1, wherein the clutch includes a roller ramp clutch mechanism.

3. A rotor drive system as recited in claim 1, wherein the clutch includes an inner hub fixed relative to the rotor portion of the electric motor and extending circumferentially about the rotation axis.

4. A rotor drive system as recited in claim 1, wherein the clutch includes an outer hub fixed relative to the rotor assembly and axially overlapping an inner hub of the clutch.

5. A rotor drive system as recited in claim 1, wherein the clutch includes a roller element radially interposed between an inner hub and an outer hub of the clutch.

6. A rotor drive system as recited in claim 5, wherein the clutch includes a resilient member urging a roller member into contact with both the inner hub and the outer hub.

7. A rotor drive system as recited in any claim 1, wherein the outer hub defines a wedge pocket radially opposing an inner hub and separated therefrom by a radial gap.

8. A rotor drive system as recited in claim 7, wherein the wedge pocket is bounded by a planar segment oblique relative to a line tangent to the inner hub.

9. A rotor drive system as recited in claim 7, wherein the wedge pocket has a radial depth on a trailing end that is greater than a radial depth on a leading end relative to a direction of rotation of rotor assembly about the rotation axis.

10. A rotor drive system as recited in claim 7, wherein the wedge pocket is bounded by a radially extending first finger on a leading end and a radially extending second finger on a trailing end, the second finger having a greater radial length than the first finger.

11. A rotor drive system as recited in claim 7, further including a roller element captive within the wedge pocket and movable therein between first and second positions, the second position trailing the first position relative to a rotation direction of the rotor assembly.

12. A rotor drive system as recited in claim 11, wherein movement of the roller into the first position engages the clutch, wherein movement into the second position disengages the clutch.

13. A rotorcraft, comprising:
an airframe;
a stationary mast fixed to the airframe and defining a rotation axis;
an electric motor with a stator portion fixed to the stationary mast and a rotor portion rotatable relative to the stator portion about the rotation axis;
a clutch connected to the rotor portion of the electric motor and externally of the airframe; and
a rotor assembly rotatable about the rotation axis and operably connected to the clutch, wherein the clutch is coaxially arranged between the electric motor and the rotor assembly about the rotation axis such that, when engaged, the electric motor is coupled to the rotor assembly by the clutch for rotating the rotor assembly about the airframe, and when disengaged, the electric motor is separated from the rotor assembly for rotating about the airframe in an autorotation state.

14. A rotorcraft as recited in claim 13, further including a clutch lock disposed axially between the rotor assembly and the electric motor.

15. A rotorcraft as recited in claim 14, wherein the clutch lock has a locked position and an unlocked position, the clutch lock coupling the electric motor to the rotor assembly in the locked position, coupling of the electric motor and rotor assembly being determined by whether the clutch is engaged or disengaged when the clutch lock is in the unlocked position.

16. A rotorcraft as recited in claim 13, wherein the clutch includes a roller ramp clutch mechanism.

17. A rotorcraft as recited in claim 13, wherein the clutch comprises:
- an inner hub splined to the rotor portion of the electric motor and extending circumferentially about the rotation axis;
- an outer hub disposed radially outward of the inner hub and extending circumferentially about the inner hub; and
- a roller element circumferentially captive relative to the outer hub and disposed radially between the inner hub and the outer hub.

18. A rotorcraft as recited in claim 17, further including bearings disposed radially between the outer hub and the stationary mast.

19. A rotorcraft as recited in claim 17, further including bearings disposed radially between the inner hub and the stationary mast.

20. A rotorcraft as recited in claim 19, wherein the stator portion of the electric motor is disposed radially between the stationary mast and the bearings.

\* \* \* \* \*